United States Patent
Benveniste (10) Patent No.: US 7,940,688 B1
(45) Date of Patent: May 10, 2011

(54) METHOD AND APPARATUS FOR CANCELING CHANNEL RESERVATIONS IN A WIRELESS NETWORK

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1030 days.

(21) Appl. No.: 11/748,259

(22) Filed: May 14, 2007

Related U.S. Application Data (60) Provisional application No. 60/800,025, filed on May 15, 2006.

(51) Int. Cl.
*H04L 12/28* (2006.01)
*H04L 12/413* (2006.01)

(52) U.S. Cl. .................................. 370/252; 370/445

(58) Field of Classification Search .......................... None
See application file for complete search history.

(56) References Cited

U.S. PATENT DOCUMENTS

| | | | | |
|---|---|---|---|---|
| 7,046,690 | B2 * | 5/2006 | Sherman | 370/445 |
| 7,161,951 | B1 * | 1/2007 | Sherman | 370/447 |
| 7,305,004 | B2 * | 12/2007 | Sherman | 370/462 |
| 7,616,655 | B2 * | 11/2009 | Benveniste | 370/447 |
| 2006/0041676 | A1 * | 2/2006 | Sherman | 709/231 |
| 2006/0227802 | A1 * | 10/2006 | Du et al. | 370/447 |

* cited by examiner

*Primary Examiner* — Nittaya Juntima
(74) *Attorney, Agent, or Firm* — Chapin IP Law, LLC; David W. Rouille, Esq.

(57) ABSTRACT

A method, apparatus and computer program product for providing collision avoidance and/or channel capture is presented. A timer (NAV) for a channel which, if set, prevents the node from transmitting on the channel is maintained at a station. A determination is made whether a duration of a transmission response (CTS) has expired. The NAV is cleared when the channel is idle for a predetermined time interval and the flag is clear, and the NAV is not cleared when the flag is set.

6 Claims, 9 Drawing Sheets

Prior Art

Prior Art

METHOD AND APPARATUS FOR CANCELING CHANNEL RESERVATIONS IN A WIRELESS NETWORK

CROSS REFERENCE TO RELATED APPLICATIONS

The present application claims the benefit of U.S. Provisional Patent Application No. 60/800,025, filed on May 15, 2006, which is incorporated herein by reference in its entirety.

BACKGROUND

A transmit opportunity (TXOP) is a sequence of frames (and their respective acknowledgements) transmitted serially, immediately following a single successful contention-based channel access attempt, as for instance that prescribed by the IEEE 802.11e standard. All TXOP frames other than the first are transmitted contention-free as the channel has been reserved for their transmission by previously transmitted frames. Each node hearing the transmissions sets its NAV timer according to the expected transmission duration advertised in these frames and refrains from transmitting until the timer expires. There are two options for setting the NAV for a TXOP. One is referred to as 'frame-by-frame' NAV setting wherein the NAV is extended with each frame/acknowledgement. The other one is referred to as 'full' NAV setting wherein the RTS/CTS indicate the entire TXOP duration. In the second case, if the TXOP duration is overestimated, it is desirable to make the channel available for use by other nodes. NAV clearing must be done in a way that respects the transmissions and reservations made according with the medium access control protocol.

Conventional wireless networks may utilize, among other, the IEEE 802.11 DCF/EDCA single-channel Protocol and the Common Control (CCC) multi-channel Protocol for medium access control. Both protocols can transmit frames in a TXOP.

The CCC protocol is a MAC protocol that extends the IEEE 802.11 distributed MAC protocol to enable use of multiple channels within a BSS or mesh network. The CCC protocol defines a flexible channel access architecture based on distributed prioritized contention-based medium access. The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic. Data can be carried also on the control channel.

Reservations for transmission on the various data channels are made by exchanging control frames on the control channel. As extensions of the legacy RTS and CTS messages, the CC-RTS and CC-CTS are used to reserve a data channel for the time it takes to transmit a Transmission Opportunity (TXOP). The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Both the forwarding and receiving node maintain a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The receiving node responds with a CC-CTS within a time interval of length Short InterFrame Space (SIFS). A CC-CTS is sent to indicate acceptance of a channel reservation request. The Reservation Duration field is copied in the CC-CTS sent by the receiving node after adjusting its value. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

The CC-RTS frame includes several fields including a source node; a destination node; a source node transmit channel; a duration and a number of frames in TXOP. A CC-CTS frame is used by a node accepting a TXOP. The CC-CTS frame includes several fields including a destination node; a source node; a source node transmit channel; a duration; a number of frames in TXOP; and a Radio Counter. A CC-ACK frame identifies the individual frame in a sequence of frames that were received successfully. The CC-ACK frame includes a destination node; source node; and a TXOP frame receipt status.

Channel Reservation occurs when the source node reserves its data channel for one or multiple frames by sending a CC-RTS frame to the destination node on the control channel, provided the NAV for the data channel indicates it will become idle within a pre-specified time. The Reservation Duration field and number of TXOP frames are set in the CC-RTS. The destination node sends a CC-CTS in response within SIFS. The reservation request is accepted if the NAV for the source node's data channel indicates it will become idle within a pre-specified time, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0. A CC-RTS frame with a Reservation Duration field set to 0 can be used in general to cancel a TXOP. This is equivalent to sending a CF-End frame or a CF-Poll addressed to self with Duration set to 0 when a single channel is used for control and data in order to clear the NAVs of neighbor nodes.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contention.

Aside from these additions and a special form of acknowledgement (which is discussed below), the CCC protocol observes the rules of the distributed random access protocol of IEEE 802.11 and its amendments (DCF and EDCA) for channel access and virtual carrier sensing, although further enhancements can enable better channel access prioritization.

CCC is backward compatible with existing 802.11 technologies. All nodes, that is both nodes using existing 802.11 technology and CCC compliant nodes, can communicate on the control channel through the existing 802.11 MAC protocol. In addition, a node that secures the reservation of a data channel will transmit on the reserved channel only after listening for a period equal to the arbitration inter-frame space to ensure that the channel is idle. This measure is introduced to allow for co-existence of CCC-compliant stations with legacy/independent stations.

SUMMARY

Conventional mechanisms such as those explained above suffer from a variety of deficiencies. One such deficiency is that wireless mesh networks can experience both collisions and channel capture when a NAV is cleared.

Embodiments of the invention significantly overcome such deficiencies and provide mechanisms and techniques that provide for a NAV clearing technique that prevents collisions and/or channel capture. In the case of a single-channel like DCF/EDCA, in order to avoid collisions caused by NAV clearing the following technique is used: A station remembers whether the duration of a CTS has expired. If not, it is said that the CTS is 'pending'. A flag CTS_PENDING is set when a new CTS arrives with non-zero Duration field. The flag is cleared when the NAV expires. A station will clear its NAV, if the channel is idle for specified time interval, and the flag CTS_PENDING is clear. If the flag CTS_PENDING is set, the station does not clear the NAV. This allows for collision avoidance caused by NAV clearing.

A similar approach is used with the multi-channel CCC mechanism. In order to clear the NAV of a data channel, a node maintains a CTS_PENDING flag for each data channel it uses. This flag is set when a CC-CTS arrives with non-zero Reservation Duration field for the data channel in question. The flag is cleared when the channel's NAV expires. Upon receiving a CC-RTS for a channel with a Reservation Duration field of 0, a node will clear its NAV for the channel if the channel's CTS_PENDING flag is clear. If the CTS_PENDING flag is set for that channel, the node does not clear the channel's NAV.

In order to avoid collisions and channel capture caused by NAV clearing the following technique is used: A station remembers whether and how many CTS may still be pending. The cancellation of a reservation is done with a frame directed to the node that accepted the reservation. For instance, in the case of the CCC multi-channel protocol, the initiator of the cancelled reservation sends a CC-RTS with Reservation Duration value of 0 to the node that sent the CC-CTS to confirm the cancelled reservation. This allows for collision avoidance channel capture avoidance caused by NAV clearing. A node that sent out a CC-CTS with Reservation Duration set to 0 in response to receiving a CC-RTS Reservation Duration set to 0, thus indicating NAV cancellation. A node will reset its NAV for a channel, if it receives indication that the channel reservation, and the counter CTS_PENDING for the channel is 0. If the counter CTS_PENDING for the channel is non-zero, the station does not reset the NAV. This also allows for collision avoidance channel capture avoidance caused by NAV clearing.

Other embodiments include a computer readable medium having computer readable code thereon for providing collision avoidance. The computer readable medium includes instructions for maintaining at a station a timer (NAV) for a channel which, if set, prevents the node from transmitting on the channel. The computer readable medium further includes instructions for determining whether a duration of a CTS has expired. Additionally the computer readable medium includes instructions for clearing the NAV when the channel is idle for a predetermined time interval and the flag is clear, and instructions for refraining from clearing the NAV when the flag is set.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for a NAV clearing technique that prevents collisions and/or channel capture as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing for a NAV clearing technique that prevents collisions and/or channel capture as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The NAV clearing mechanism is an optional mechanism of the IEEE 802.11 standard which allows a station to clear its NAV if the station used information from an RTS frame as the most recent basis to update its NAV and there is no signal detected for a specified time interval (2 SIFS+CTS_duration+2 SlotTime) [IEEE 802.11:9.2.5.4] the NAV may be cleared. This allows reuse of the channel in case the 4-way handshake cannot be completed.

Another NAV clearing mechanism may be utilized when Dual CTS Protection is not required by the Access Point (AP) of a BSS, then a station (STA) that used information from an RTS frame as the most recent basis to update its NAV setting is permitted to reset its NAV if no PHY-RXSTART.indication is detected from the PHY during a period with a duration of (2×aSIFSTime)+(CTS_Time)+aPHY-RX-START-Delay+(2×aSlotTime) starting at the PHY-RXEND.indication corresponding to the detection of the RTS frame. The "CTS_Time" is calculated using the length of the CTS frame and the data rate at which the RTS frame used for the most recent NAV update was received Referring now to FIG. 1, an environment depicting the problem with collisions caused by conventional NAV clearing is shown. The environment 10 includes a first independent BSS (IBSS) 12, having stations 1, 2, and 3 (also referred to as mesh points or MPs). A second IBSS 14 which includes stations 4 and 5 is also shown. The IBSSs 12 and 14 overlap in the coverage area 16, which includes station 4. This forms an Overlapping BSS (OBSS) wherein two stations have overlapping coverage and can use the same channel. The environment in this figure is also typical of an ad hoc network consisting of nodes 1, 2, 3, 4, and 5.

Figure 1:
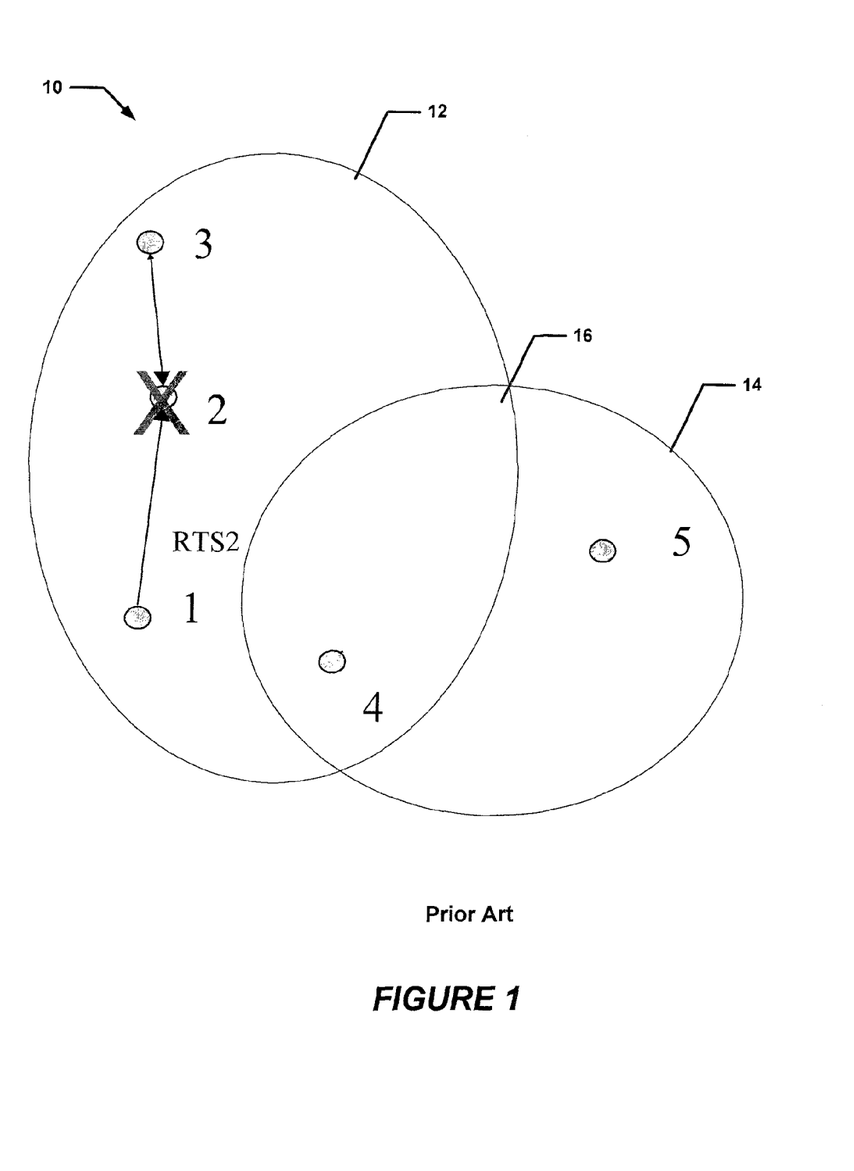
FIG. 1 is a block diagram depicting a BSS which shows a collision following NAV clearing.

In a particular example, MP 2 is receiving a transmission from MP 3 that is not heard at MP 1. An RTS from MP 4 to MP 5 causes the NAV at MP 1 to be reset. Accordingly, the CTS from MP 2 will not have caused the NAV at MP 1 to be last updated. MP 1 clears its NAV when the NAV-setting transmission from MP 4 ends while MP 3 is still transmitting. If MP 1 transmits it will cause a collision at MP 2.

In order to overcome the scenarios wherein a collision can result from conventional NAV clearing, the following procedure is used. A determination is made regarding whether a channel reservation made by a CTS has expired. This can be accomplished by setting a flag when a new CTS arrives having a non-zero duration field and clearing the flag when the NAV expires. The station will clear it's NAV when the channel is idle for a predetermined time interval and the flag is clear; and refraining from clearing the NAV when said flag is set.

Figure 2:
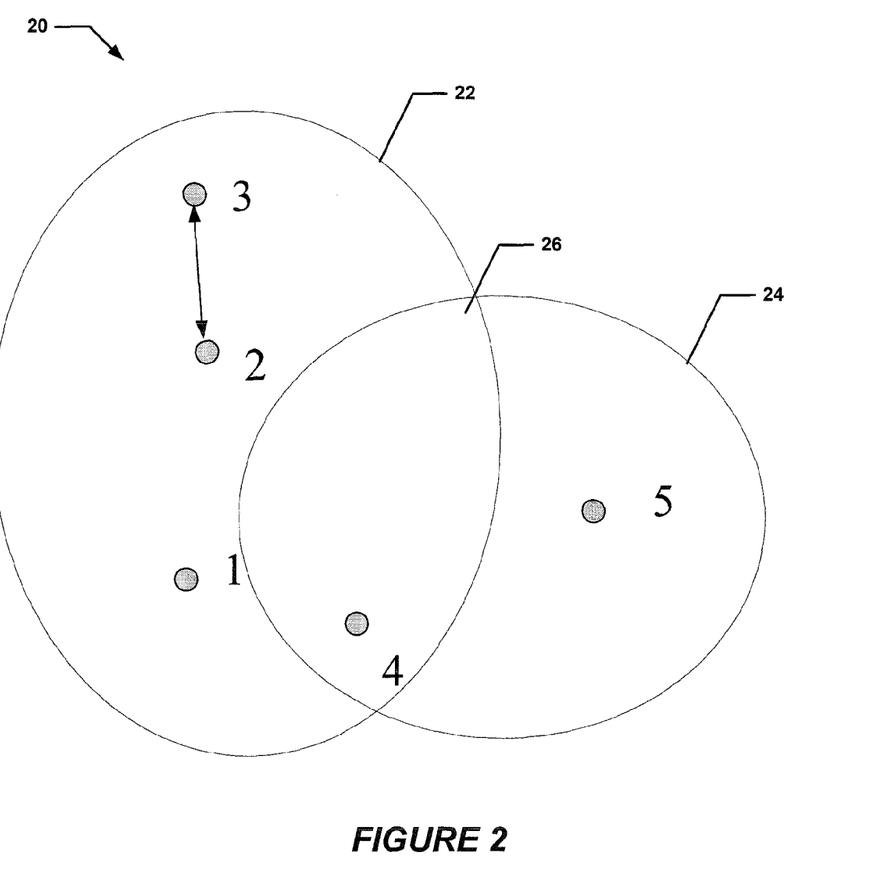
FIG. 2 is a block diagram depicting a BSS which shows an example of collision avoidance in accordance with embodiments of the invention.

An example of a collision avoidance technique is illustrated in the diagram of FIG. 2. This is similar to environment 10 in FIG. 1, in that this environment 20 includes a first IBSS 22, having stations 1, 2, and 3 (also referred to as mesh points or MPs). A second IBSS 24 which includes stations 4 and 5 is also shown. The IBSSs 22 and 24 overlap in the coverage area 26 which includes station 4. This forms an Overlapping BSS (OBSS) wherein two stations have overlapping coverage and can use the same channel.

In a particular example, MP 2 is receiving a transmission from MP 3 that is not heard at MP 1. MP 1 remembers that its NAV was set by a CTS by setting its CTS_PENDING flag. An RTS from MP 4 to MP 5 causes the NAV at MP 1 to be updated. Although the RTS from MP 4 is the last updating of the NAV at MP 1, the CTS_PENDING flag is still set at MP 1. MP 1 does not clear its NAV when the NAV setting transmission from MP4 ends since the flag CTS_PENDING is still set, therefore MP1 will not transmit, thus there is no collision at MP 2.

Figure 3:
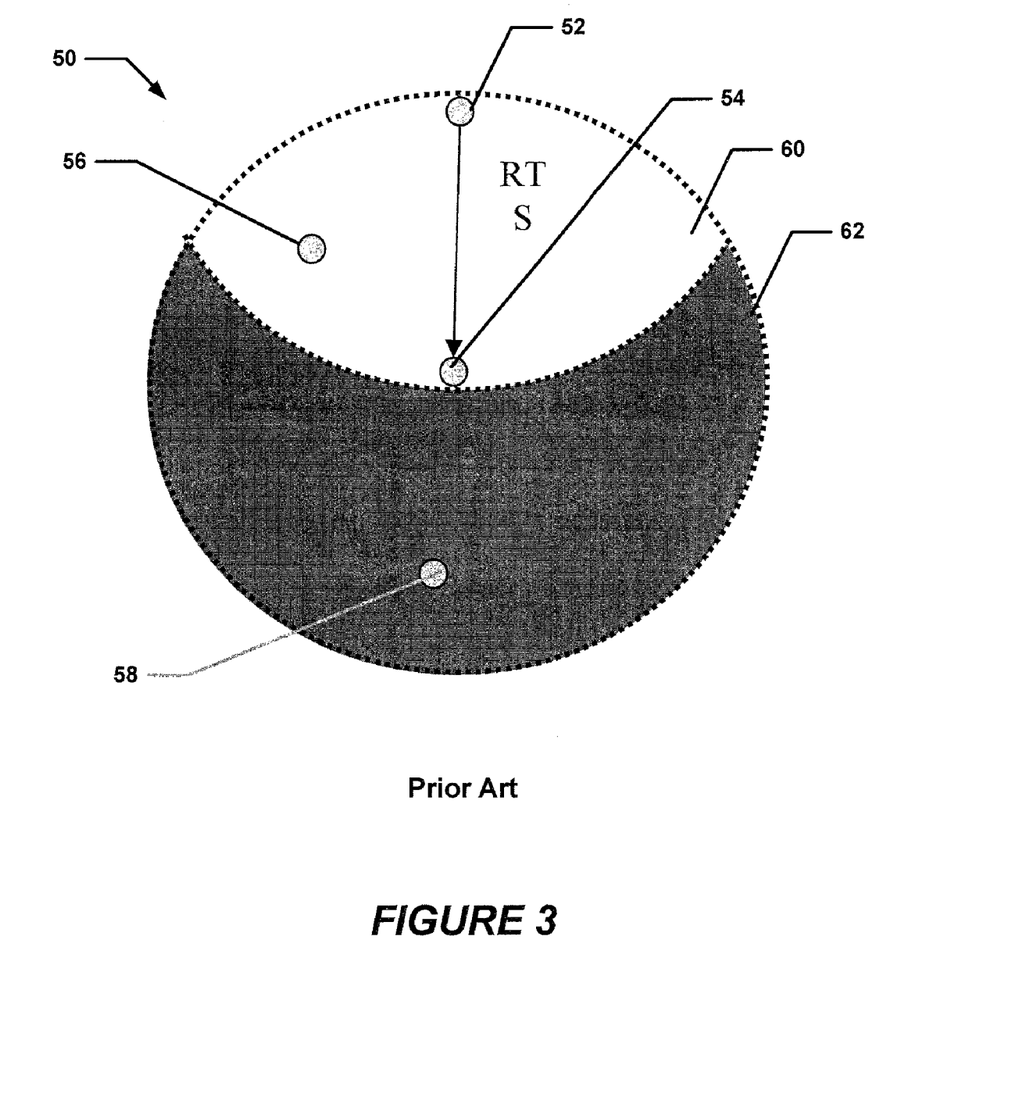
FIG. 3 is a block diagram depicting a BSS which shows channel capture caused by NAV clearing.

Referring now to FIG. 3, an environment 50 depicting the problem with channel capture caused by conventional NAV clearing is shown. The environment 50 includes MPs 52, 54, 56 and 58. MPs 54 and 56 are physically close to MP 52, while MP 58 is remotely located from MP 52.

Channel capture occurs when a subset of one or more stations gain access to a channel with greater probability than other BSS members with traffic of comparable access priority. In conventional BSS environments, only the MPs that set their NAV as a result of an RTS will reset their NAVs (e.g., MP 56). MPs that update their NAVs by the CTS will not have a way to know that the reservation was shortened (e.g., MP 58). The MPs farther away (e.g. MP 58) will have their NAVs set needlessly. As a result neighbors of transmitting MPs are able to gain access to the channel more readily, at the expense of the remote MPs (e.g. MP 58).

One way of avoiding channel capture is by notifying all nodes that set their NAV for a channel when the channel reservation is cancelled. The node that authorized the reservation, i.e. the node that sent the CTS in response to the RTS, supplies the notification of cancellation of that reservation. Thus, the node determines whether it is a destination of a pending transmission request (RTS), and if so it sends notice of the cancellation. In a single channel infrastructure BSS, only uplink transmissions (i.e. from a station to the AP) may not be audible to all BSS members. Hence, only the AP must provide notification of cancellation of a reservation. A similar approach is employed when a multi-channel MAC protocol is utilized, except that all flags and counters are channel specific. The frame used for notification of cancellation of a reservation is also channel specific. In the multi-channel CCC protocol, the frame canceling the reservation is a CC-RTS with Reservation Duration value of 0 sent by the node that initiated the reservation. It is addressed is the node that authorized the reservation. A response to the canceling frame will provide the needed notification. Before a node cancels the NAV it must be ascertain that there are no additional reservations caused by a CTS that are still pending. Hence, a node keeps a counter of all CTS received; it is called CTS_PENDING. This counter is decremented every time notification of reservation cancellation is received and is cleared when the NAV expires. The station also will reset its NAV only when the CTS_PENDING counter is clear; and refraining from resetting the NAV when the CTS_PENDING counter is set.

Figure 4:
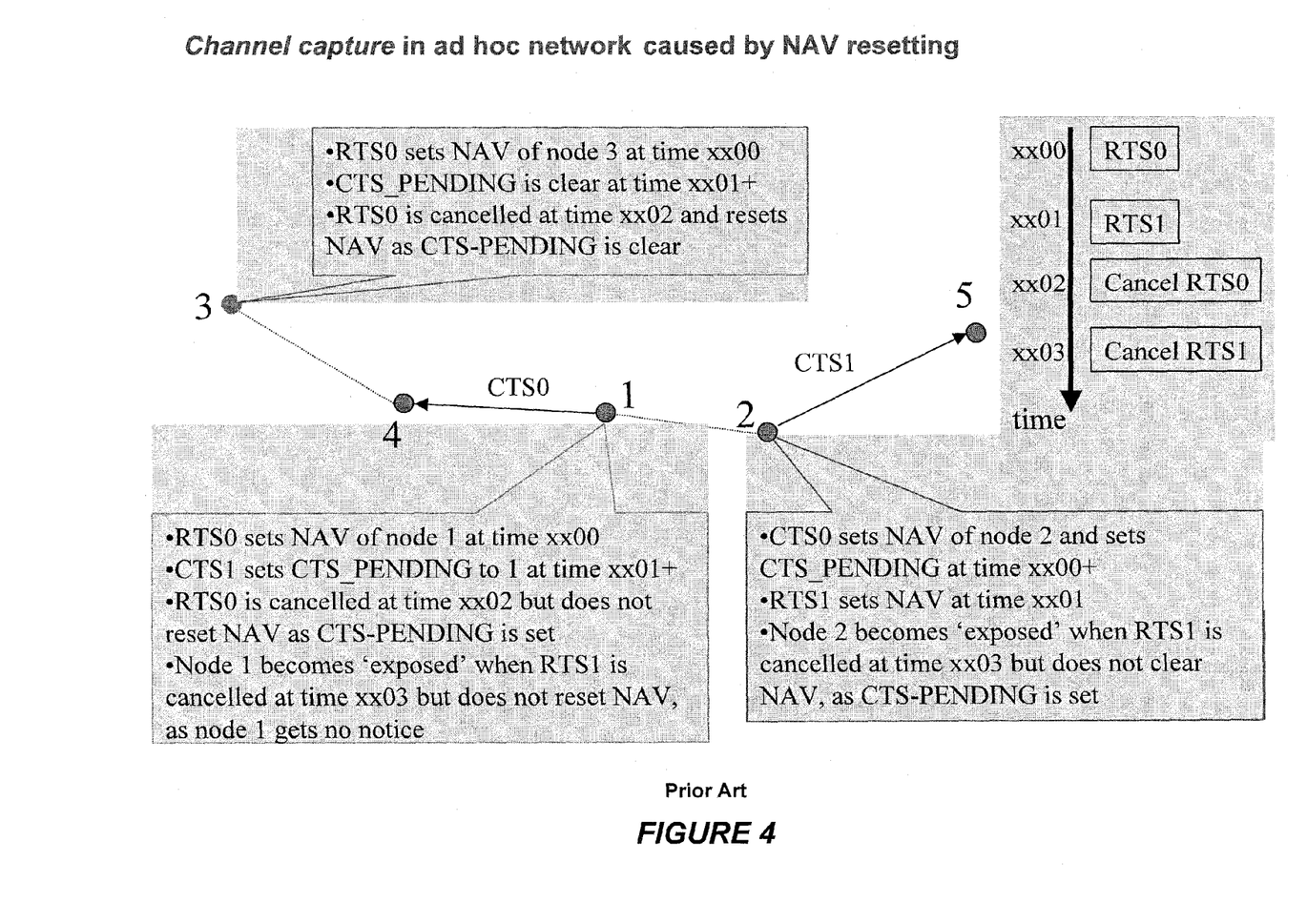
FIG. 4 is a block diagram depicting an ad hoc network which shows channel capture caused by NAV resetting.

Another example illustrates capture for the multi-channel CCC protocol in FIG. 4. At time t0, an CC-RTS0 from node 4 to node 1 sets the NAV of channel X at node 3 and node 1. A CC-CTS0 for channel X from node 1 to node 4 sets the NAV of channel X at node 2 and also sets the CTS_PENDING flag of node 2. At time t1, CC-RTS1 from node 5 to node 2 sets the NAV of channel X at node 2. The CC-CTS1 from node 2 to node 5 sets the CTS_PENDING flag for node 1. At time t2, the reservation for channel X made through CC-RTS0 is cancelled. This resets the NAV for channel X at node 3 as CTS_PENDING is clear. At node 1, the CC-RTS0 being cancelled does not reset the NAV for channel X as CTS_PENDING is set. The reservation for channel X made through CC-RTS1 is cancelled at t3. This results in node 1 becoming exposed because it does not reset the NAV for channel X, as node 1 gets no notice. Node 2 also becomes exposed because it does not clear its NAV for channel X as CTS_PENDING is set.

Figure 5:
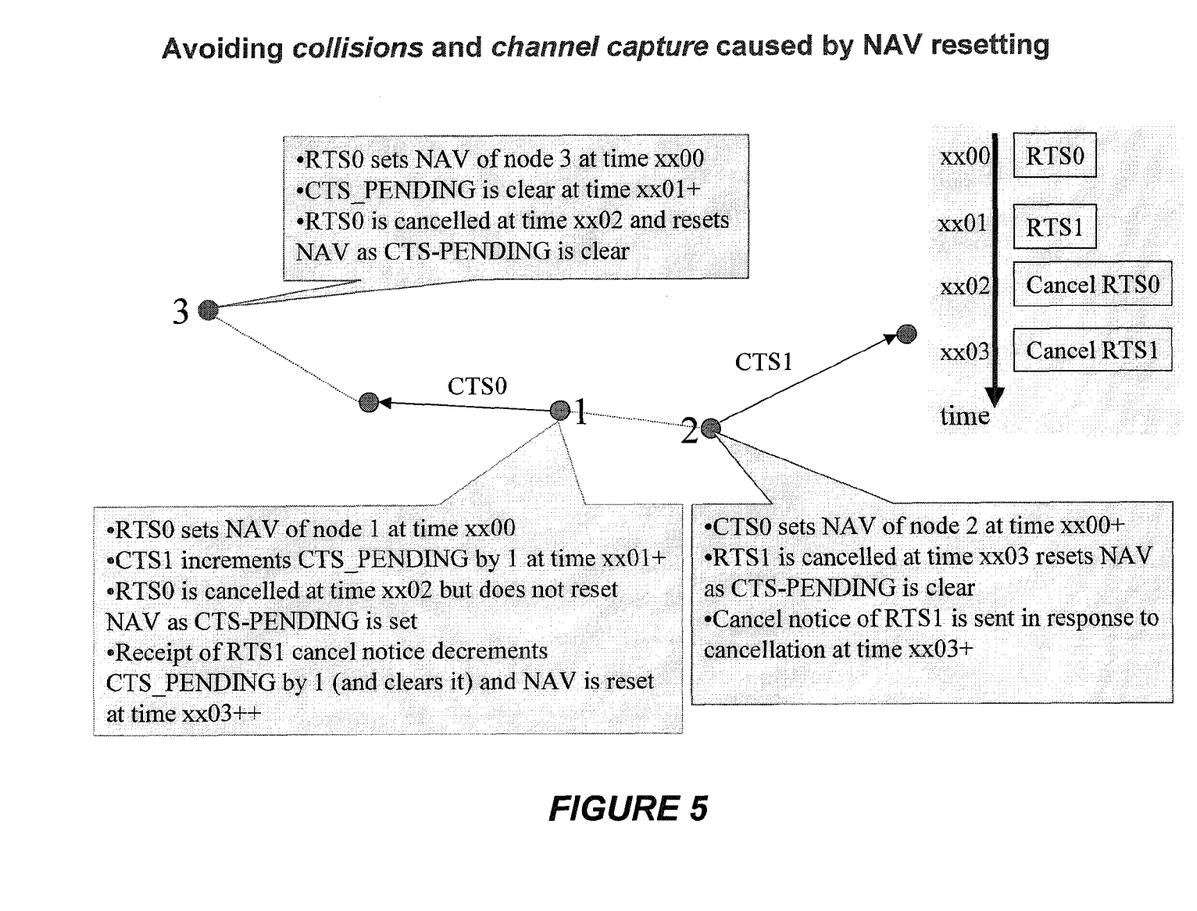
FIG. 5 is a block diagram depicting an ad hoc network which shows an example of collision avoidance and channel capture avoidance in accordance with embodiments of the invention.

Referring now to FIG. 5, a similar environment is shown, however, in accordance with embodiments of the present invention, collisions and channel capture are both avoided. At time t0, an CC-RTS0 from node 4 to node 1 sets the NAV of channel X at node 3 and node 1. A CC-CTS0 from node 1 to node 4 sets the NAV of channel X at node 2. The CC-CTS1 from node 2 to node 5 increments the CTS_PENDING counter for node 1. At time t2, the reservation for channel X made through CC-RTS0 is cancelled. This is carried out by node 4 sending a CC-RTS for channel X to node 1 with Reservation Duration set to 0. This resets the NAV for channel X at node 3 as CTS_PENDING is clear. At node 1, the CC-RTS0 being cancelled does not reset the NAV as CTS_PENDING is set. Node 1 responds to the received CC-RTS with a CC-CTS with Reservation Duration set to 0. This causes the CTS_PENDING counter at node 2 to decrement its CTS_PENDING counter. The reservation for channel X made through CC-RTS1 is cancelled at t3. This is carried out by node 5 sending a CC-RTS to node 2 with Reservation Duration set to 0, followed by a CC-CTS response with the same Reservation Duration value. Following this, receipt of a CC-CTS with Reservation Duration set to 0 at node 1 decrements CTS_PENDING by 1 (and clears it) and the NAV is reset. At node 2, the NAV is cleared as the CTS_PENDING counter is 0. No nodes become exposed, and collisions and channel capture are avoided.

Figure 6:
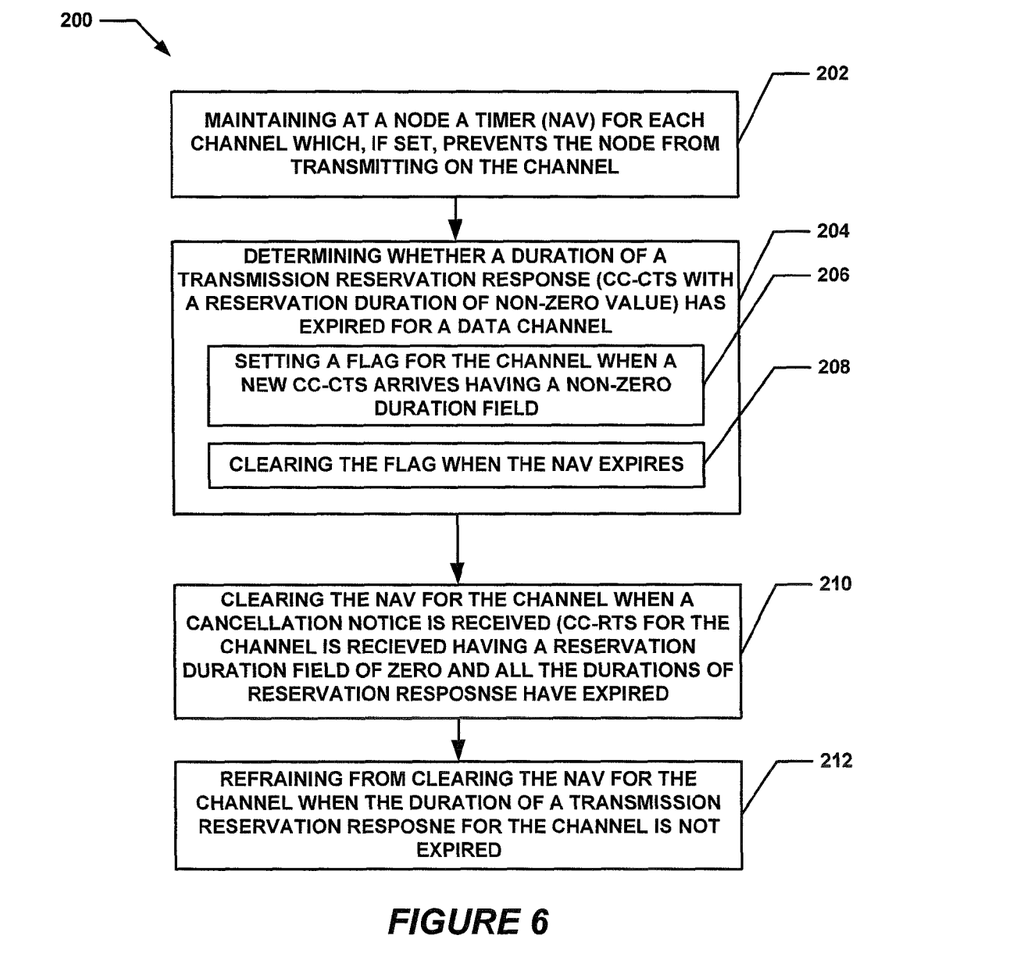
FIG. 6 depicts a flow diagram of a particular embodiment of a method of providing collision avoidance in a multichannel CCC environment in accordance with embodiments of the invention.
Figure 7:
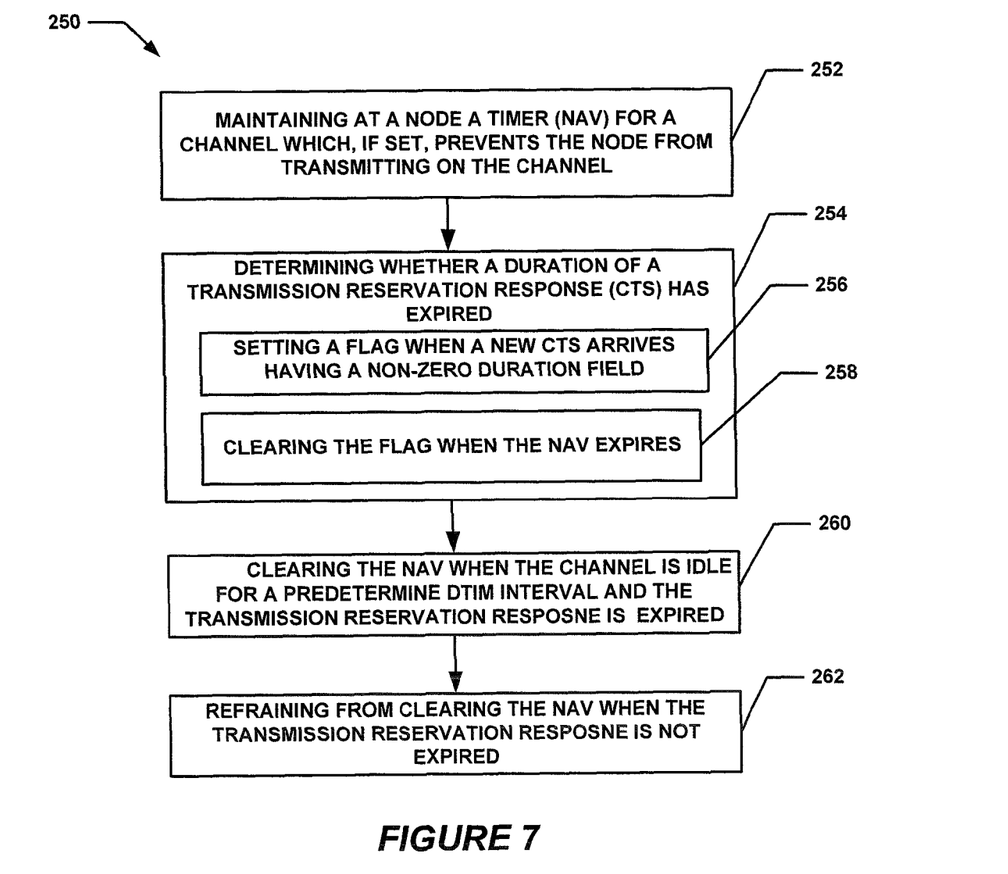
FIG. 7 depicts a flow diagram of a particular embodiment of a method of providing collision avoidance in a single channel environment in accordance with embodiments of the invention.
Figure 8:
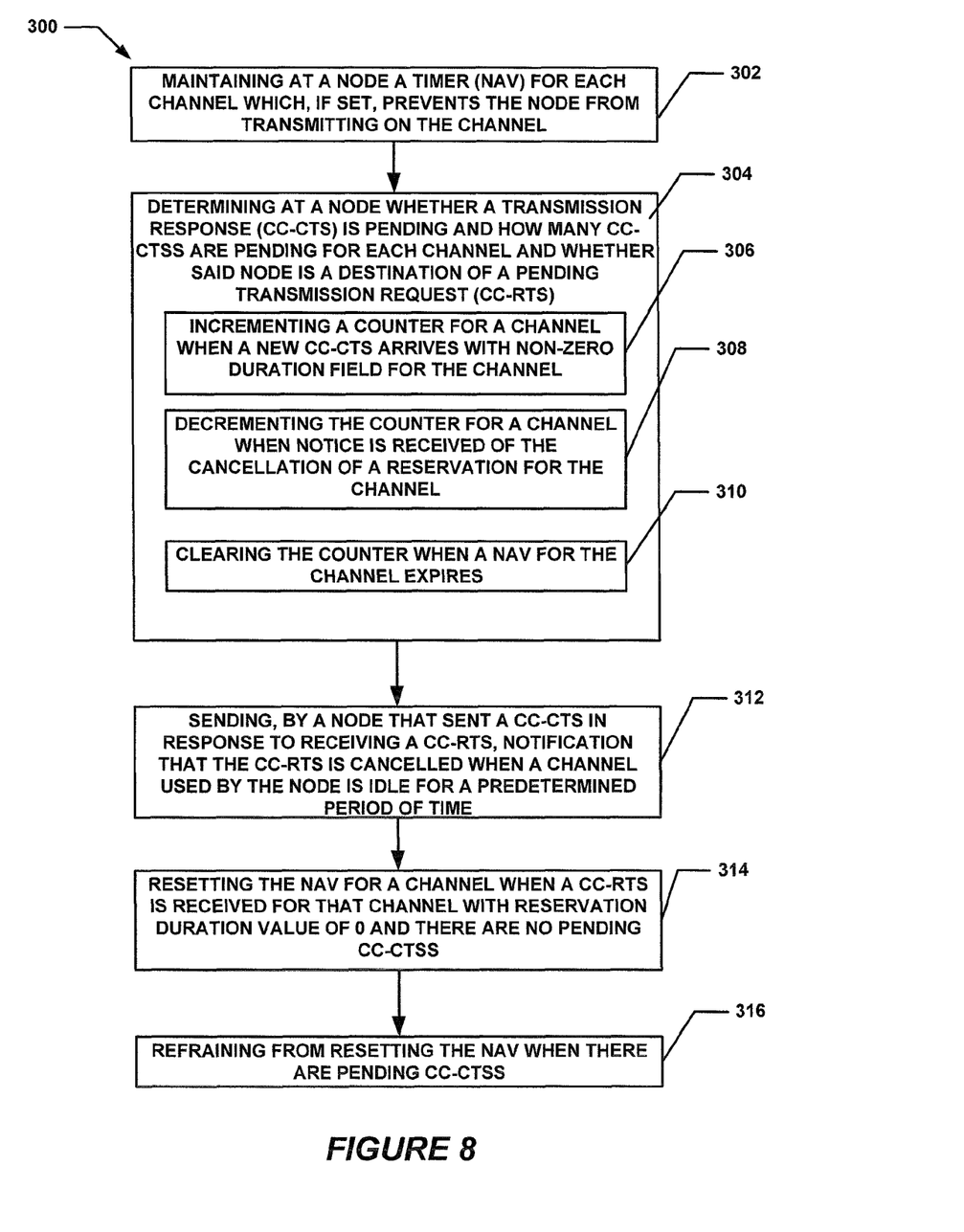
FIG. 8 depicts a flow diagram of a particular embodiment of a method of providing collision avoidance and channel capture avoidance in a multichannel CCC environment in accordance with embodiments of the invention.

Flow charts of embodiments of the presently disclosed methods are depicted in FIGS. 6 through 8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 6 a flow diagram of a particular embodiment of a method 200 of providing collision avoidance in a multi-channel environment is shown. The method 200 begins with processing block 202 which discloses maintaining at a node a timer (NAV) for each channel which, if set, prevents the node from transmitting on the channel.

Processing block 204 states determining whether a duration of a transmission response (CC-CTS) has expired for a data channel. This may include, as shown in processing block 206, setting a flag for the channel when a new CC-CTS arrives having a non-zero duration field. This may further include, as shown in processing block 208, clearing the flag when the NAV expires.

Processing block 210 recites clearing the NAV for the channel when a CC-RTS for the channel is received having a Reservation Duration field of zero and the CC-CTS is expired. Processing block 212 discloses refraining from clearing the NAV for the channel when the CC-CTS for the channel is not expired.

Referring now to FIG. 7, a particular embodiment of a method 250 of providing collision avoidance in a single channel environment is shown. The method begins with processing block 252 which discloses maintaining at a node a timer (NAV) for a channel which, if set, prevents the node from transmitting on the channel.

Processing block 254 states determining whether a duration of a transmission response (CTS) has expired. This may include, as shown in processing block 256, setting a flag when a new CTS arrives having a non-zero duration field and, as shown in processing block 258, clearing the flag when the NAV expires.

Processing block 260 states clearing the NAV when there is indication that a channel reservation is cancelled and the CTS is expired. Processing block 262 recites refraining from clearing the NAV when the CTS is not expired.

FIG. 8 illustrates an example embodiment of a method 300 of providing collision avoidance and channel capture avoidance in a multi-channel CCC environment. The method begins with processing block 302 which states maintaining at a node a timer (NAV) for each channel which, if set, prevents the node from transmitting on the channel Processing block 304 recites determining at a node whether a transmission response (CC-CTS) is pending and how many CC-CTSs are pending for each channel. This may include as shown in processing block 306 incrementing a counter for a channel when a new CC-CTS arrives with non-zero Duration field for the channel. Processing block 308 discloses decrementing the counter for a channel when notice is received of the cancellation of a reservation for the channel and processing block 310 states clearing the counter when a NAV for the channel expires.

Processing block 312 recites sending, by a node that sent a CC-CTS in response to receiving a CC-RTS, notification that the CC-RTS is cancelled when a channel used by the node is idle for a predetermined period of time.

Processing block 314 discloses resetting the NAV for a channel when a CC-RTS is received for that channel with Reservation Duration value of 0 and when there are no pending CC-CTSs and processing block 316 states refraining from resetting the NAV when there are pending CC-CTSs.

Figure 9:
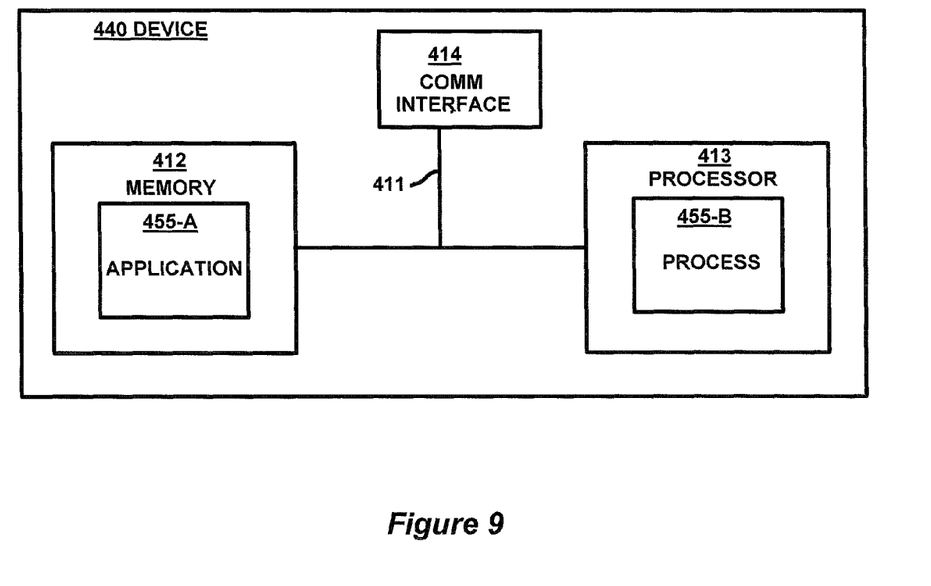
FIG. 9 illustrates an example computer system architecture for a computer system that performs collision avoidance and channel capture avoidance in accordance with embodiments of the invention.

FIG. 9 illustrates example architectures of a computer system that is configured as a host computer system 440. The computer system 440 may be any type of computerized system such as a personal computer, workstation, portable computing device, mainframe, server or the like. In this example, the system includes an interconnection mechanism 411 that couples a memory system 412, a processor 413, and a communications interface 414. The communications interface 414 allows the computer system 440 to communicate with external devices or systems.

The memory system 412 may be any type of computer readable medium that is encoded with an application 455-A that represents software code such as data and/or logic instructions (e.g., stored in the memory or on another computer readable medium such as a disk) that embody the processing functionality of embodiments of the invention for the agent 455 as explained above. The processor 413 can access the memory system 412 via the interconnection mechanism 411 in order to launch, run, execute, interpret or otherwise perform the logic instructions of the applications 455-A for the host in order to produce a corresponding agent process 455-B. In other words, the agent process 455-B represents one or more portions of the agent application 455-A performing within or upon the processor 413 in the computer system. It is to be understood that the agent 455 operate as explained in former examples are represented in FIG. 10 by the agent application 455-A and/or the process 455-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 412 (e.g., within random access memory or RAM). It is also to be understood that other embodiments of the invention can provide the applications operating within the processor 413 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing collision avoidance and channel capture avoidance in a multi-channel Common Control Channel (CCC) environment, the method comprising:
   maintaining at a node a timer comprising a Network Allocation Vector (NAV) for each channel which, if set, prevents the node from transmitting on the channel:
   determining at a node whether a transmission reservation response, comprising a Common Control-Clear To Send (CC-CTS) with reservation duration of non-zero value, is pending and how many CC-CTSs are pending for each channel;
   determining whether said node is a destination of a pending transmission request comprising a Common Control-Request To Send (CC-RTS);
   sending, by a node that sent a CC-CTS in response to receiving a CC-RTS, notification that the CC-RTS is cancelled when a channel used by the node is idle for a predetermined period of time;
   resetting said NAV for a channel when the channel is idle for a predetermined period of time and when there are no pending CC-CTSs; and
   refraining from resetting said NAV when there are pending CC-CTSs.

2. The method of claim 1 wherein said determining at a node whether a CC-CTS is pending and how many CTSs are pending comprises:
   incrementing a counter for a channel when a new CC-CTS arrives with non-zero Duration field for the channel;
   decrementing said counter for a channel when notice is received of the cancellation of a reservation for the channel; and
   clearing said counter when a NAV for the channel expires.

3. The method of claim 2 wherein said determining whether said node is a destination of a pending RTS comprises:
   setting a flag when a node is the destination of a CC-RTS requesting channel;
   clearing said flag when a Transmit Opportunity (TXOP) cancellation request is sent; and
   clearing said flag when said NAV expires.

4. A non-transitory computer readable medium having computer executable instructions thereon for providing collision avoidance and channel capture avoidance in a multi-channel CCC environment, the medium comprising:
   instructions for maintaining at a node a timer comprising a Network Allocation Vector (NAV) for each channel which, if set, prevents the node from transmitting on the channel:
   instructions for determining at a node whether a transmission reservation response, comprising a Common Control-Clear To Send (CC-CTS) with reservation duration of non-zero value, is pending and how many CC-CTSs are pending for each channel;
   instructions for determining whether said node is a destination of a pending transmission request comprising a Common Control-Request To Send (CC-RTS);
   instructions for sending, by a node that sent a CC-CTS in response to receiving a CC-RTS, notification that the CC-RTS is cancelled when a channel used by the node is idle for a predetermined period of time;

instructions for resetting said NAV for a channel when the channel is idle for a predetermined period of time and when there are no pending CC-CTSs; and instructions for refraining from resetting said NAV when there are pending CC-CTSs.

5. The computer readable medium of claim 4 wherein said instructions for determining at a node whether a CC-CTS is pending and how many CTSs are pending comprises:

instructions for incrementing a counter for a channel when a new CC-CTS arrives with non-zero Duration field for the channel;

instructions for decrementing said counter for a channel when notice is received of the cancellation of a reservation for the channel; and     instructions for clearing said counter when a NAV for the channel expires.

6. The computer readable medium of claim 5 wherein said instructions for determining whether said node is a destination of a pending Request To Send (RTS) comprises:

instructions for setting a flag when a node is the destination of a CC-RTS requesting channel;

instructions for clearing said flag when a Transmit Opportunity (TXOP) cancellation request is sent; and     instructions for clearing said flag when said NAV expires.

\* \* \* \* \*